United States Patent [19]
Wakefield

[11] 3,767,465
[45] Oct. 23, 1973

[54] ELECTRO-CHEMICAL CELLS
[75] Inventor: Brian Wakefield, Essex, England
[73] Assignee: The Ever Ready Company (Great Britain) Limited, London, England
[22] Filed: Sept. 24, 1971
[21] Appl. No.: 183,345

[30] Foreign Application Priority Data
Oct. 6, 1970 Great Britain.................. 47,495/70

[52] U.S. Cl................. 136/24, 136/28, 136/120 R, 219/78
[51] Int. Cl. ..................... H01m 43/04, B23k 13/00
[58] Field of Search................... 136/134, 120 R, 6, 136/28, 24, 29; 219/78

[56] References Cited
UNITED STATES PATENTS
3,108,909  10/1963  Stanimirovich...................... 136/28
3,607,432  9/1971  Johnson............................... 136/28

Primary Examiner—A. B. Curtis
Assistant Examiner—H. A. Feeley
Attorney—John P. Snyder et al.

[57] ABSTRACT

A conducting metallic tag is welded to impregnated porous electrode material for an electro-chemical cell by forming a layer of sintered metal on the tag, the metal being selected so as not to interfere with the electro-chemical operation of the electrode when assembled in a cell, pressing the tag against the electrode material with the sintered metal adjacent the electrode material, and welding the two together by passage of electric current.

11 Claims, 5 Drawing Figures

PATENTED OCT 23 1973　　　　　　　　　3,767,465
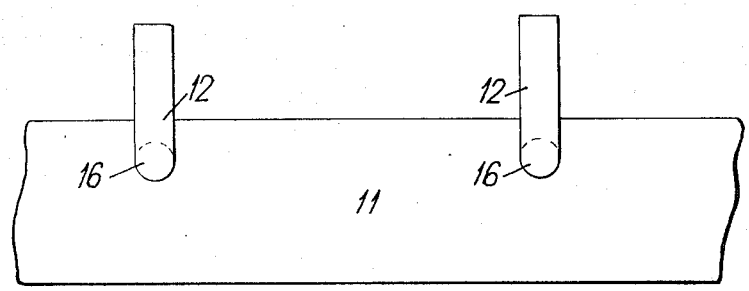
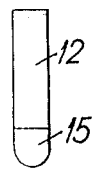  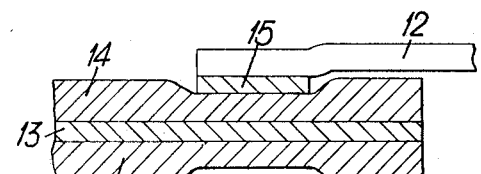
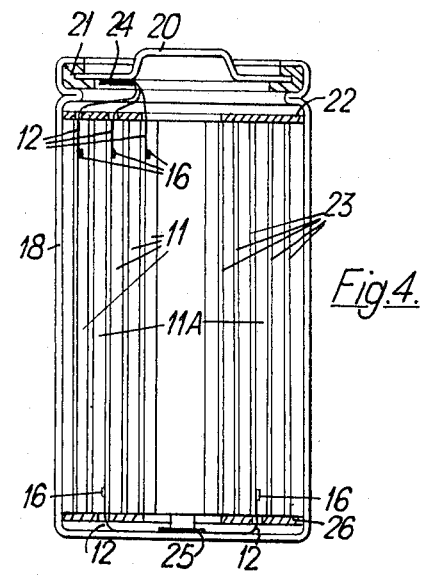
Inventor
BRIAN WAKEFIELD

ELECTRO-CHEMICAL CELLS

BACKGROUND OF THE INVENTION

The invention relates to electrodes for electro-chemical cells or batteries of such cells and is particularly concerned with the attachment of conducting tags to electrodes formed of impregnated porous material.

In electro-chemical cells and batteries it is common to make connections between the external casing members and the internal electrodes in order to conduct electric current into or out of the cell. For some cells which work at low current densities it is adequate to make such connections by means of mechanical pressure contact between the electrodes and cell casing members. However, in cells such as the secondary nickel-cadmium, silver-zinc, silver-cadmium and similar types which are normally used at high current rates, such mechanised pressure contacts have too high an electrical resistance and it is necessary to connect the electrodes in a more positive way so as to ensure low contact resistance. It is desirable in these cases to use a conducting metallic tag which is fixed at one end to the electrode and at the other end to the casing or other conducting member providing an external terminal. A particular problem arises in fixing such tags to impregnated porous electrode material in a way which provides good mechanical and electrical connection. In some cases the electrodes may consist of impregnated sintered plates in the form of long narrow strips which are tightly coiled inside a metallic can. In these cases, it may be necessary to attach a tag to the strip mid-way along its length, or at several spaced positions along its length so as to maintain low total resistance and an even current distribution throughout the length of the electrode. Conventional ways of welding do not provide a satisfactory result on impregnated sintered material. Some attempts have been made to overcome this problem which involve removal of sintered metal from an area of the electrode support material before the tag is connected. Other attempts have been made to provide projecting parts of the electrode support material, either at the ends of the strip or along its sides, on which no sintered coating is formed, so that connection may be made with the projecting parts. Other attempts have involved compression and cleaning of the sintered material prior to welding. However, none of these ways provide an entirely satisfactory and reliable way of obtaining the required mechanical and electrical connection.

SUMMARY OF THE INVENTION

It is one object of the present invention to provide an improved way of connecting a metallic tag to impregnated porous electrode material.

The present invention provides a method of welding a conducting metallic tag to impregnated porous electrode material, which method comprises the steps of forming a layer of sintered metal on the tag, the metal being selected so as not to interfere with the electro-chemical operation of the electrode when assembled in a cell, pressing the tag against the electrode material with the sintered metal adjacent the electrode material, and welding the two together by passage of electric current.

The metal on the tag may for example be nickel, and the electrode material may consist of impregnated sintered nickel on a support member.

Normally the porous electrode material is impregnated with non-metallic material, such as for example, nickel or cadmium oxides or hydroxides.

The electrode may be in the form of an elongated strip which has a plurality of conducting metallic tags welded to it at intervals along its length.

BRIEF DESCRIPTION OF THE DRAWINGS

FIG. 1 shows a length of electrode strip material to which tags are welded at spaced intervals along its length;

FIGS. 2 and 3 are front side views respectively of one tag;

FIG. 4 is a diagrammatic view of an assembled electro-chemical cell; and

FIG. 5 is a schematic cross-section through the junction of one tag to an impregnated sintered electrode strip.

DESCRIPTION OF THE PREFERRED EMBODIMENT

In this example the electrode material consists of a long narrow strip 11 to which a number of conducting metallic tags 12 are fixed at spaced intervals along its length. The strip 11 consists of a suitable metal support strip 13 both faces of which are entirely covered by a layer 14 of impregnated sintered metal, as shown in FIG. 5.

The tags 12 are shown more clearly in FIGS. 2 and 3. Each tag is formed of suitable metal sheet material (e.g., nickel or nickel plated steel) and has a small area 15 of unimpregnated sintered metal, such as nickel, at one end. The sintered metal 15 forms a thin layer on one side only of the tag.

To fix the tag 12 to the electrode strip 11, the tag is placed on the strip with the sintered metal 15 lying against the impregnated porous layer 14 as shown in FIG. 5 and the body of the tag projecting from one side of the strip 11. The two are then welded together directly by passing welding current through the joint via welding electrodes placed above and below the joint which move towards each other and press the two parts firmly together causing some deformation of the strip 14 as shown in FIG. 5. The welding electrodes may be pneumatically operated copper electrodes of circular cross-section which pass a short duration high current pulse, so that a circular weld area, marked 16 in FIG. 1, results. This operation may be repeated to fix a desired number of tags at intervals along the strip 11. The strip 11 is cut to the required length and width for a particular electrode, before the tags 12 are attached.

In order to produce the tags 12, a plain sheet of the required tag material is degreased by treatment with hot trichlorethylene vapour and is then coated on one side with a fine slurry of nickel powder (or other metal powder if other metals are to be used). The material then has a thick coating of nickel and is passed under a grooved scraping device which removes all the coating except in the regions passing below the grooves. The coating is then partially dried at a relatively low temperature (for example 150°C – 250°C) to give an adherent coating and this is subsequently sintered in the usual way. This involves heating to a much higher temperature in a reducing atmosphere. For example, temperatures of the order of 800°C to 1,000°C may be used for periods of the order of 10 to 30 minutes. The final thickness of sintered coating on the tags is of the order of 0.2 mms. to 0.3 mms. To form the separate tags, the coated tag material is treated by conventional blanking tools to produce blanks of the shape shown in FIG. 2 with the sintered layer lying adjacent the rounded end of each tag.

FIG. 4 shows diagrammatically an electro-chemical cell using electrode strips 11 to which tags 12 are fixed as described above. In this case, two electrode strips 11 and 11a each constructed as described with reference to FIG. 1, are separated by a porous separator 23 and wound face to face in a coil contained in a cylindrical metal can 18. The tags 12 connected to one of the electrodes project downwardly and are welded at 25 to the base of the can 18. The tags 12 from the other electrode project upwardly and are welded at 24 to a conducting top plate 20. The plate 20 is insulated from the rest of the can 18 by a sealing gasket 21. Insulating discs 22 and 26 are provided at the top and bottom respectively of the electrodes.

In the above example, the cell is a rechargeable nickel-cadmium cell. In this case, the porous layer 14 on the electrodes consists of sintered nickel impregnated with nickel or cadmium hydroxides and the sintered layer on the tags 12 is sintered nickel. Cells may be made by use of the present invention, which can discharge their capacity in less than 1 hour. It is important to select the sintered metal for use on the tags 12 so that it does not interfere with the electro-chemical operation of the electrodes in an assembled cell. Generally, the sintered metal on the tags 12 may be the same as the sintered metal on the electrode strips. As the impregnation material used is non-metallic and interferes with satisfactory welding, it is important that the sintered metal on the tags 12 is not impregnated in this way.

The welding on electrodes may apply a pressure of the order of 40 psi. and the welding current pulse may have a duration of approximately 1/20th second with a peak value of 5,000 – 6,000 amps.

It will be appreciated that the invention is not limited to the details of the example described above.

It is found that the method described is reliable in providing a good mechanical and electrical connection between the tags and the porous electrode material. It is advantageous in the following respects.

No selvedge is required on the electrode material and the impregnated sintered strip can therefore be made of the maximum width to suit the particular cell size being made thus allowing maximum capacity in a given volume. No prior cleaning, compression or scraping of the electrode is required. The welding operation is completed in one cycle of the welding machine; it is not necessary nor desirable to make multiple welds. The diameter of the welding electrode can with advantage be such that it covers completely the rounded end of the tags and this leads to a very strong, clean weld having no undesirable protruberances. Because the weld is very clean it is not necessary to use any masking sleeves or tape to cover projections of metal which might cause short circuiting during later stages of cell assembly or use. The weld can be positioned anywhere on the face of the electrode thus allowing optimisation of current distribution. The resistance of the junction does not change significantly even after excessive charging and discharging of the electrodes under severe conditions. The weld is mechanically very strong and in many instances is stronger than the support material.

Since the tags can be welded anywhere onto a piece of electrode material it is possible to produce standard electrode material in great lengths of only a few different widths and from these strips make a very wide range of electrode and cell sizes with an absolute minimum of scrap material.

I claim:

1. A method of welding a conducting metallic tag to porous electrode material, formed of porous metal and impregnated with material selected from the group consisting of oxides and hydroxides of electrochemically active metals, which method comprises the steps of forming a layer of sintered metal over an area of the tag, the metal being selected so as not to interfere with the electro-chemical operation of the electrode when assembled in a cell, pressing the tag against the electrode material with the area of sintered metal in contact with the electrode material, and welding the two together by passage of electric current.

2. A method according to claim 1 in which the metal on the tag is nickel.

3. A method of welding a conducting metallic tag to electrode material consisting of porous sintered nickel on a support member, the sintered nickel being impregnated with material selected from the group consisting of oxides and hydroxides of electro-chemically active metals, which method comprises the steps of forming a layer of sintered nickel over an area of the tag, pressing the tag against the electrode material with the area of sintered nickel on the tag in contact with the impregnated sintered nickel on the electrode material, and welding the two together by passage of electric current.

4. A method as claimed in claim 3, in which the porous electrode material is impregnated with non-metallic material selected from the oxides and hydroxides of nickel and cadmium.

5. A method according to claim 1, in which welding electrodes are used to press the tag against the electrode material.

6. A method according to claim 1, in which welding is effected by a short duration high current pulse.

7. An electrode for an electro-chemical cell having an impregnated porous surface to which a conducting metallic tag is welded by the method claimed in claim 1, thereby providing good electrical connection between the tag and the electrode material.

8. An electrode as claimed in claim 7 in which the electrode is in the form of an elongated strip which has a plurality of conducting metallic tags welded to it at intervals along its length by the method claimed in Claim 1.

9. An electro-chemical cell, or an electric battery having a number of such cells, having at least one electrode as claimed in claim 8.

10. A nickel cadmium electro-chemical cell having two impregnated electrodes, conducting tags being connected to each electrode by the method claimed in claim 3.

11. In a method of making an electro-chemical cell having an external casing member and an internal electrode between which electrical connection is to be made, the steps of:

a. forming an internal electrode having a porous surface layer of metal impregnated with material selected from the group consisting of oxides and hydroxides of nickel and cadmium;

b. forming a metal tag having a selected surface area portion thereof provided with a layer of sintered metal, which sintered metal will not interfere with the electro-chemical operation of the cell;

c. contacting said layer of sintered metal in face-to-face opposition to said impregnated porous surface layer of metal of said internal electrode;

d. joining said tag and said electrode mechanically and electrically by pressing them together while simultaneously passing a momentary electric current through them.

* * * * *